May 18, 1937. L. CAMPBELL, JR 2,080,396
APPARATUS FOR GAS CUTTING AND WELDING OF METALS
Filed July 15, 1935 2 Sheets-Sheet 2
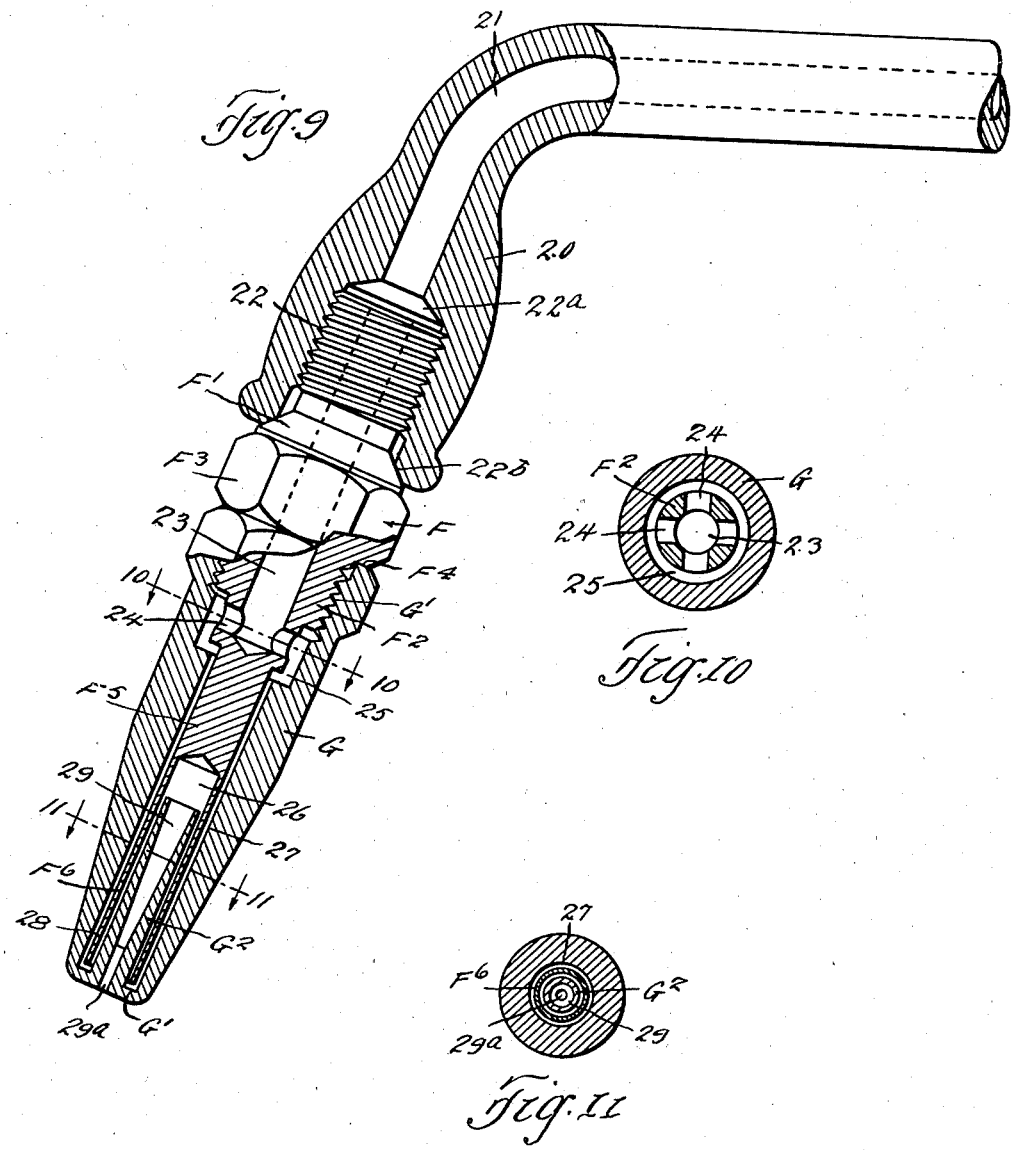
INVENTOR.
Lour Campbell, Jr.,
BY Hull, Brock & West,
ATTORNEYS.

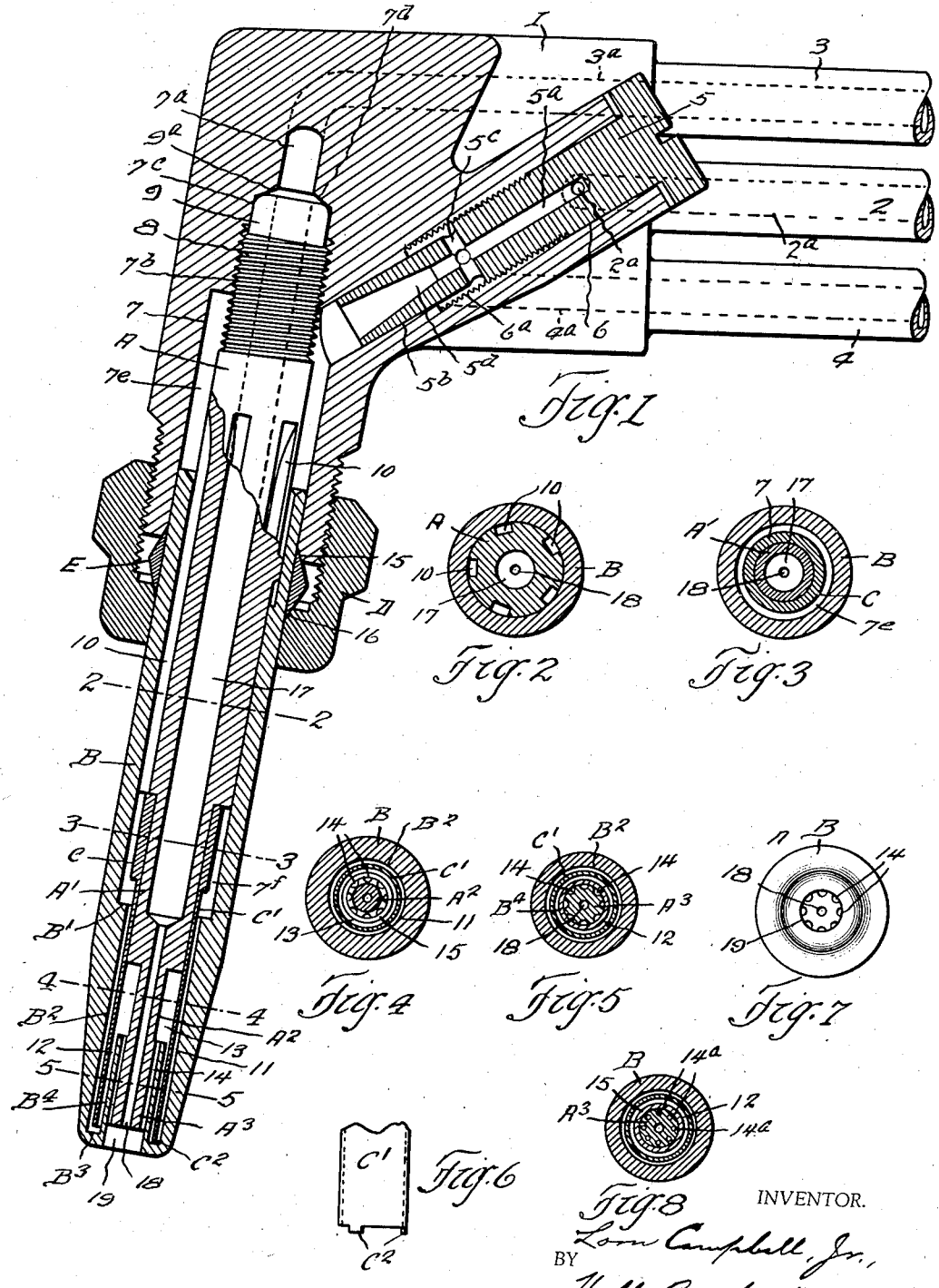

Patented May 18, 1937

2,080,396

UNITED STATES PATENT OFFICE 2,080,396

APPARATUS FOR GAS-CUTTING AND WELDING OF METALS

Lorn Campbell, Jr., Lakewood, Ohio

Application July 15, 1935, Serial No. 31,323

14 Claims. (Cl. 158—27.4)

This invention relates to an apparatus for the heat treatment of metals, and especially for such purposes as the cutting and welding of metals where these operations must be performed in confined spaces.

In my Patent No. 1,850,379 granted March 22, 1932, I have disclosed blowpipe tips that are suitable for the cutting and welding of metal, wherein oxygen is circulated adjacent to the external shells of the tips, the oxygen being expanded during such circulation and serving to prevent destructive heating of the tips while having its temperature increased due to the absorption of heat during the operation of the said tips.

The tips described in my aforesaid patent are representative of the type known to the trade as "mixed in the tip"; that is to say, the oxygen and the fuel gas are delivered to each of the tips through separate passages, and the gases are mixed only in the tips. There is another type of cutting and welding apparatus wherein the oxygen and fuel gases are preliminarily mixed before their introduction to the tips. My invention herein relates more particularly to this latter type of apparatus.

In the operation of the cutting blowpipe shown in my aforesaid patent, it will be noted that only the oxygen used for cutting is circulated in proximity to the outer shell of the tip before it is delivered to the central bore thereof. I have found that, in operating in confined spaces—for instance, in cutting metal at the bottoms of deep holes or pockets—it has been impracticable to perform such operations satisfactorily, either with the apparatus of my aforesaid patent or with any other prior apparatus, with which I am familiar, due to the fact that the reflected heat in such pockets or holes has caused the ends of the tips to burn off before the metal to be operated upon can be raised to the kindling point. Welding blowpipes constructed as shown and described in my aforesaid patent are limited to the use of a separate supply of oxygen to the tips thereof.

It is the general purpose and object of this invention to provide a process and an apparatus which will not only enable me to accomplish cutting and welding operations in the confined spaces referred to, but will also enable me to perform certain cutting and welding operations with a more efficient heating of the oxygen and fuel gas mixtures; with a more efficient commingling of the same prior to their delivery at the end of a tip; which will permit me to accomplish cutting and welding operations with a marked increase in efficiency and economy in consumption of the gases; and which will also eliminate much of the adherence of metallic oxide to the ends of the tips. The factors entering into the accomplishment of the foregoing objects will be explained hereinafter in connection with the embodiments of my apparatus shown in the drawings hereof wherein Fig. 1 represents a central longitudinal sectional view through a cutting tip constructed in accordance with my invention, showing the same assembled with the head of a blowpipe, certain parts being shown in elevation; Figs. 2, 3, 4, and 5 are sectional views corresponding respectively to the lines 2—2, 3—3, 4—4, and 5—5 of Fig. 1; Fig. 6 is a detail in elevation of the lower end of the sleeve which is carried by the inner tip member; Fig. 7 is a bottom plan view of the tip shown in Fig. 1; Fig. 8 is a view, similar to Fig. 5 showing a modification of the lower end of the inner tip member; Fig. 9 is a central longitudinal view through a welding blowpipe having applied thereto a tip constructed in accordance with my invention, certain parts being shown in elevation; and Figs. 10 and 11 are sectional views corresponding respectively to the lines 10—10 and 11—11 of Fig. 9 and looking in the direction of the arrows.

As is well known, the oxygen for use with ordinary blowpipes is contained in tanks wherein it is subjected to a pressure of approximately 2000 pounds per square inch. This means that, when reduced to the operating pressure usually employed in blowpipes—from 25 to 50 pounds per square inch—there is a marked reduction in its temperature, such reduction frequently reaching the freezing point. When this oxygen is heated it expands and, by so doing, enables a more intimate commingling of the same with fuel gas to be obtained, with a corresponding increase in efficiency of operation. The effect of the heat upon the efficiency is very marked. For example, in operating a cutting tip such as shown and described herein the oxygen pressure was set at 50 pounds per square inch while the fuel gas, an example of which is natural gas, was supplied to the tip at a pressure of about 5 pounds per square inch. With the preheating flames properly set, the tip was introduced into a ¾" hole bored through a ¾" plate, in order to preheat and pierce a plate of similar thickness lying flat against and beneath the former plate. After the tip had been in this pocket for a few seconds, it was withdrawn, when it was plainly apparent that the flame had become exceedingly oxidized, notwithstanding the fact that neither the pressures of the respective gases nor the control valves had been altered. The expansion of the oxygen in passing through the tip and under the influence of the heat to which the shell of the tip was subjected had caused the oxygen to dam the flow of the combustible gas and to make it necessary to increase the proportion of the combustible gas and to partially reduce the proportion of the oxygen in order to re-establish, in the operation of the heated tip, the character of flame initially established, when the tip was in a cold condition.

In other words, because of the intimacy of the mixture of the oxygen with the combustible gas and because of the heating of such mixture, I have been enabled to effect a material saving in the expensive oxygen used for cutting and welding purposes; also to perform welding and cutting operations under conditions hitherto considered impracticable or impossible of accomplishment, and to accomplish these latter objects without destruction of the tips and with the adherence of much less metallic oxide to the ends of the same.

Describing by reference characters the construction and arrangement of the parts in the drawings by which I am enabled to secure the foregoing objects and advantages, and first with particular reference to Figs. 1 to 8 inclusive, I denotes the head of a cutting blowpipe, the said pipe having passages therein communicating respectively with a pipe 2 for preheating oxygen, a pipe 3 for cutting oxygen, and a pipe 4 for combustible gas. The pipe 2 communicates by a passage $2^a$ with the upper end of the bore $5^a$ of a combined injector and mixing plug 5 which is threaded into a bore 6 in the head. $6^a$ denotes an annular chamber which is provided in said bore around the lower reduced end $5^b$ of said plug and which communicates by a passage $4^a$ for combustible gas and by ports $5^c$ with the bore of the plug 5. The combustible gas is entrained by the oxygen flowing through the upper end of the bore $5^a$ and is partly mixed therewith in the lower expanded portion $5^d$ of the bore in the plug. This mixture is then delivered into the upper end of a cylindrical bore 7 formed in the lower portion of the head 1 and surrounding the upper portion of the inner member of the tip.

Cutting oxygen is supplied from the pipe 3 through a suitable passage $3^a$ in the head to the upper end of a passage $7^a$ forming a central extension of the bore 7 but which is out of communication with said bore when the tip is assembled in the head.

The tip comprises an inner member, indicated generally at A and an outer member, indicated generally at B. The inner member consists of a body which is generally cylindrical throughout the major portion of its length, being provided with threads 8 above the central body portion thereof adapted to be received within a threaded reduced extension $7^b$ of the bore 7, and having a reduced upper end 9 adapted to fit snugly within a cylindrical extension $7^c$ of the bore 7 and having also an upper end which is rounded at its junction with the part 9, as shown at $9^a$, said portion adapted to engage the frusto-conical wall $7^d$ interposed between the parts $7^a$ and $7^c$. The body A is provided with slots 10 formed in its outer surface and extending longitudinally thereof, the slots forming with the surrounding portion of the outer tip member B passages for the preheating mixture of oxygen and combustible gas.

Below the cylindrical body A, the inner tip member is reduced in diameter, as shown at A'; and below the part A' it is still further reduced in diameter to provide a neck, as shown at $A^2$. Pressed or otherwise tightly secured upon the portion A' of the inner tip body is a sleeve having an upper cylindrical external portion C and a lower cylindrical external portion C' of less diameter than the former portion, it being noted that the reduced portion C' of the sleeve extends in close proximity to the bottom of the outer tip member B, which will now be described in more detail.

The outer tip member is fitted tightly upon the outer surface of the part A of the inner tip member, its upper end terminating below the tops of the slots 10 and defining, with the upper portion of the part A of the inner tip member and with the wall of the bore 7, an annular chamber $7^e$, when the tip is assembled within the said bore.

Below the upper part C of the sleeve C, C', the outer tip member is provided with a radially inwardly extending shoulder B'; and extending downwardly from the inner edge of said shoulder is a cylindrical wall $B^2$, forming a narrow annular passage 11 with the outer surface of the lower part C' of the said sleeve. The cylindrical wall $B^2$ extends below the lower end of the sleeve porton C'; and at the lower end of the wall $B^2$ there is a radially inwardly extending wall $B^3$, which is closely adjacent to the bottom of the outer tip member. From the inner edge of the wall $B^3$ a cylindrical sleeve $B^4$, preferably integral with the outer tip member, extends upwardly and fits closely upon the lower end $A^3$ of the body of the inner tip member.

It will be noted that a narrow annular passage 12 is provided between the inner wall of the sleeve member C' and the outer wall of the sleeve $B^4$. Between the portions A' and $A^3$ of the inner member and the surrounding sleeve member C' an annular expansion chamber 13 is formed, which chamber receives the preheating mixture of oxygen and combustible gas delivered thereto through the annular passages 11 and 12 and distributes the mixture to the passages 14 which are formed in the delivery portion $A^3$ of the inner tip member, as by means of slots formed in the outer surface of such portion, said slots being closed by the sleeve member $B^4$.

As a modification of the manner of forming the delivery passages for the preheating mixture, the lower end of the inner tip member may have the passages $14^a$ drilled therethrough, as shown in Fig. 8.

The inner tip member is provided with an enlarged central bore section 17 extending throughout the major portion of its length from the upper end thereof and adapted to register with, and being preferably of the same diameter as the bore $7^a$ in the head, the lower end of the bore section 17 merging with a restricted bore section 18, located centrally with respect to the passages 14, $14^a$.

The outer and inner tip members are assembled by forcing the outer tip member over the inner tip member; and the lower end of the sleeve C' is provided with lugs $C^2$ which are adapted to engage the wall $B^3$ and thus serve as a stop to insure the assembling of the inner and outer members in proper relation to each other.

The outer and inner members, being thus assembled, may be secured in place, as by means of a shouldered nut D, which is threaded onto the lower reduced end of the head 1, the bottom of the bore 7 of said head being shown as provided with an upwardly and inwardly tapered wall 15 which is adapted to receive the upper tapered edge of a washer E fitting snugly around the outer surface of the tip member B, and the shouldered portion of the nut D being provided with a similar wall 16 adapted to engage the correspondingly tapered lower end of said washer.

With the parts constructed and arranged as described, it is believed that the operation will be readily understood. Preheating oxygen is delivered to the bore $5^a$ of the injector and mixer and, as it passes the ports $5^c$, it entrains the combustible gas. The partial mixture thus formed in the expanded part $5^d$ of the plug bore is delivered into the chamber $7^e$, where it is further mixed and expanded in the blowpipe head, and this partial mixture is still further and thoroughly mixed in its course through the passages 10, the annular expansion chamber $7^f$, the annular passages 11 and 12, the expansion and distributing chamber 13, and the preheating passages 14, or $14^a$. The metal having been raised to the proper temperature by the impingement of the preheating jets, cutting oxygen is turned on in the usual manner through the central bore 17, 18 of the inner tip member.

It will be noted that the lower end of the inner tip member terminates above the lower end of the outer tip member to provide a cup or recess within the latter member, as indicated at 19. The provision of this cup is advantageous in the use of certain gases, for instance city gas, but may be dispensed with in connection with other gases.

In Figs. 9, 10, and 11 there is shown a welding torch equipped with a tip constructed in accordance with my invention wherein 20 denotes the head which is provided with a passage 21 for the mixture of oxygen and combustible gas. The lower end of the passage 21 is connected with the reduced upper end $22^a$ of a threaded bore 22, which is adapted to receive the threaded upper end of the inner member F of a welding tip, the said member having an upwardly an inwardly inclined wall F' adapted to engage a similar wall $22^b$ formed within the lower end of the head 20.

G denotes the outer welding tip member which is provided at its upper end with a threaded bore G' by which it is threaded onto a corresponding externally threaded portion $F^2$ of the inner tip member, the inner tip member being provided with an intermediate portion $F^3$ which is adapted to receive a wrench and having below such intermediate portion a wall $F^4$ serving as a stop for the upper end of the outer tip member.

The inner tip member is provided with a central bore 23 adapted to receive the mixture from the passage 21. This bore extends downwardly below the threaded portion $F^2$ of the tip and there communicates by ports 24 with an annular expansion and distributing chamber 25 provided between the inner and outer tip members. Below these ports, the inner tip member is provided with a reduced cylindrical extension $F^5$ which reaches nearly to the bottom of the outer tip member, the lower end of such extension being in the shape of a sleeve $F^6$ having a chamber 26 in the upper end thereof. Between the parts $F^5$ and $F^6$ and the part of the outer tip member surrounding the same, there is provided a narrow annular passage 27, said passage extending downwardly from the chamber 25 to the bottom of the sleeve $F^6$, where a wall G' is provided within and close to the bottom of the outer tip member, said wall extending radially inwardly beyond the bottom of the sleeve $F^6$; and from the inner end of said wall the outer tip member is provided with an upwardly extending sleeve $G^2$, shown as formed integral therewith, there being a narrow annular passage 28 formed between the sleeves $F^6$ and $G^2$, through which the mixture is delivered into the chamber 26. The central portion of the outer tip member is provided with the final passage for the delivery of oxygen and combustible gas for welding purposes, this passage being preferably of the shape shown in the drawings; that is to say, being enlarged at the upper end, as designated at 29, and converging downwardly to a point near the lower end where it terminates in the reduced cylindrical passage $29^a$.

In the operation of the welding tip just described, the mixture of oxygen and combustible gas is expanded in the manner described hereinbefore in connection with the cutting tip and is conducted in cooling relation to the exterior of the welding tip, the oxygen and combustible gas being thoroughly intermingled and heated before their delivery through the passage 29, $29^a$.

Tips constructed and operating in accordance with my invention are not only efficient in operation when used under ordinary working conditions, but are capable of use under difficulties heretofore considered insuperable, the tips being self-cooling when operated under either the ordinary conditions or the extraordinary conditions referred to hereinbefore; and, because of their relatively cool condition, the adherence of metallic oxide thereto, as previously indicated, is greatly reduced.

Having thus described my invention, what I claim is:

1. A blowpipe comprising in combination a head having a passage therein for cutting oxygen and a passage for a preheating mixture of oxygen and a combustile gas, and a tip mounted in said head and having a bore adapted and arranged to receive cutting oxygen from the corresponding passage in said head and having one or more delivery passages for the preheating mixture spaced from the delivery end of said bore, the said tip also having communicating passages one of which is adapted to receive at one end thereof the mixture from the appropriate passage in said head, the communicating passages in said tip being adapted and arranged to circulate the mixture thus received in opposite directions and adjacent to the lower end of said tip and between the exterior of the tip and the delivery passage or passages and to deliver the mixture thus circulated to the delivery passage or passages.

2. A blowpipe comprising in combination a head having a passage therein for cutting oxygen and a passage for a preheating mixture of oxygen and a combustible gas, and a tip mounted in said head and having a bore adapted and arranged to receive cutting oxygen from the corresponding passage in said head and having one or more delivery passages for the preheating mixture spaced from the delivery end of said bore, the said tip having inner and outer communicating passages having their lower ends adjacent to the lower end of the tip and being located between the exterior of the tip and the delivery passage or passages, one of the last two passages being adapted to receive the mixture of oxygen and combustible gas from the appropriate passage in said head and the other of the last two passages communicating with the former of said passages and delivering the mixture to the delivery passage or passages.

3. A blowpipe comprising in combination a head having a passage therein for cutting oxygen and a passage for a preheating mixture of oxygen and a combustible gas, and a tip mounted in said head and having a bore adapted and arranged to receive cutting oxygen from the corresponding passage in said head and having one or more delivery passages for the preheating mixture spaced from the delivery end of said bore, the said tip having means adapted to communicate at one end with the passage for the preheating mixture in said head and providing a circuitous passage for the circulation of such mixture substantially the entire length of the exposed portion of said tip and between the exterior of the tip and the said delivery passage or passages and for delivering the mixture thus circulated to the last mentioned passage or passages.

4. A blowpipe comprising in combination a head having a passageway therein for cutting oxygen and a passage for a preheating mixture of oxygen and a combustible gas, and a tip mounted in said head and having a bore adapted and arranged to receive cutting oxygen from the corresponding passage in said head and having one or more delivery passages for the preheating mixture spaced from the delivery end of said bore, said tip having a passage extending entirely around the lower portion of the tip and located between the delivery passage or passages and the outer shell of said tip, and communicating with the passage for preheating mixture in said head and with the said delivery passage or passages.

5. A blowpipe comprising in combination a head having a passage therein for cutting oxygen and a passage for a preheating mixture of oxygen and a combustible gas, and a tip mounted in said head and having a bore adapted and arranged to receive cutting oxygen from the corresponding passage in said head and having one or more delivery passages for the preheating mixture spaced from the delivery end of said bore, said tip having an inner passage and an outer passage extending around the lower portion thereof and located externally of the said delivery passage or passages, one of said surrounding passages communicating at its upper end with the passage for preheating mixture in the head and delivering said mixture to the lower end of the other surrounding passage, the last mentioned surrounding passage in turn delivering the mixture to the preheating passage or passages.

6. A blowpipe comprising in combination a head having a passage therein for cutting oxygen and a passage for a preheating mixture of oxygen and a combustible gas, and a tip mounted in said head and having a bore adapted and arranged to receive cutting oxygen from the corresponding passage in said head and having one or more delivery passages for the preheating mixture spaced from the delivery end of said bore, said tip having an inner passage and an outer passage extending around the lower portion thereof and located externally of the said delivery passage or passages, the outer of the surrounding passages communicating at its upper end with the passage for preheating mixture in said head and communicating at its lower end with the inner surrounding passage, and the latter surrounding passage communicating at its upper end with the delivery passage or passages.

7. A blowpipe comprising in combination a head having a passage therein for cutting oxygen and a passage for a preheating mixture of oxygen and a combustible gas, and a tip mounted in said head and having a bore adapted and arranged to receive cutting oxygen from the corresponding passage in said head and having one or more delivery passages for the preheating mixture spaced from the delivery end of said bore, said tip having an upwardly extending passage adjacent to the bottom thereof and a downwardly extending passage having its lower end adjacent to the bottom thereof and communicating at its bottom with the last mentioned passage, the downwardly extending passage communicating with the passage for the preheating mixture in said head and the upwardly extending passage communicating with the preheating passage or passages at the delivery end of said tip.

8. A blowpipe comprising a head having a passage therein for cutting oxygen and a passage for a preheating mixture of oxygen and a combustible gas, and a tip secured to said head and comprising an inner and an outer member, the inner member being provided with a bore communicating with the first mentioned passage, the outer member being mounted upon the inner member, there being one or more delivery passages for the preheating mixture spaced from the delivery end of the said bore, the said tip having means whereby the mixture of oxygen and combustible gas from the passage in said head may be circulated in reverse directions between said outer and inner members and to a point adjacent to the lower end of said outer tip member and may then be delivered to the said preheating passage or passages.

9. A blowpipe comprising a head having a passage therein for cutting oxygen and a passage for a preheating mixture of oxygen and a combustible gas, and a tip secured to said head and comprising an inner and an outer member, the inner member being provided with a bore communicating with the first mentioned passage, the outer member being mounted upon the inner member, there being one or more delivery passages for the preheating mixture spaced from the delivery end of the said bore, the said tip having means whereby the mixture of oxygen and combustible gas from the passage in said head may be circulated downwardly substantially the full length of the portion of the tip which extends below said head, and then upwardly, and then delivered to the passages for preheating mixture at the delivery end of the tip.

10. A blowpipe comprising in combination a head having a passage therein for cutting oxygen and a passage for a preheating mixture of oxygen and a combustible gas, and a tip mounted in said head and having a central bore therethrough adapted and arranged to receive cutting oxygen from the corresponding passage in said head and having a narrow annular passage communicating at its upper end with the passage in said head for the said mixture and extending to a point adjacent to the bottom of the tip and having a narrow annular passage located radially within the former annular passage and communicating therewith at the bottom of the former passage, the said tip having delivery passages for the preheating mixture located between the second annular passage and the central bore.

11. A blowpipe comprising a head having a passage for a mixture of oxygen and a combustible gas, and a tip secured to said head and comprising an inner and an outer member, one of said members having a delivery passage, there being a passage between the lower portion of the inner member and the outer member and surrounding the lower portion of the inner member and communicating with the passage in said head and there being an annular passage located radially within the surrounding passage and provided between the lower portion of the inner member and a lower portion of the outer member therewithin and communicating at its bottom with the bottom of such surrounding passage and in turn surrounding the delivery passage and delivering the mixture thereinto.

12. A blowpipe comprising a head having a passage for a mixture of oxygen and a combustible gas, and a tip secured to said head and comprising an inner and an outer member, there being an annular chamber between said members communicating with said passage and an annular passage between the lower end of the inner member and the outer member and communicating at its upper end with said chamber, and there being an annular passage located radially within the first annular passage and formed between the lower portion of the inner member and a lower portion of the outer member therewithin and communicating at its bottom with the bottom of the first annular passage, one of said members being provided with a chamber above the upper end of the inner annular passage and being provided with a delivery passage communicating with said chamber.

13. A blowpipe comprising in combination a head having therein a passage for a mixture of oxygen and a combustible gas and a tip connected to said head and having one or more delivery passages for the mixture, the said tip having a passageway communicating at one end with the first mentioned passage and extending into proximity to the flame-end of the tip and communicating at its opposite end with the delivery passage or passages thereby to circulate the mixture in cooling relation to the flame end of the tip.

14. A blowpipe comprising a head having a passage for a mixture of oxygen and a combustible gas and a tip secured at one end to said head and having at its opposite end a passage from which flame is projected, said tip having a passageway communicating at one end with the first mentioned passage and extending into proximity to the flame-end of the tip and thence upwardly and communicating at its opposite end with the second passage, whereby the mixture is circulated downwardly and upwardly in proximity to the flame end of the tip thereby to exercise a cooling effect upon such end.

LORN CAMPBELL, Jr.